Nov. 2, 1965    H. D. SWEENEY    3,215,272
PROCESS OF SEPARATION OF SUSPENDED FOREIGN MATERIALS
FROM AN AQUEOUS MEDIUM
Filed May 16, 1961
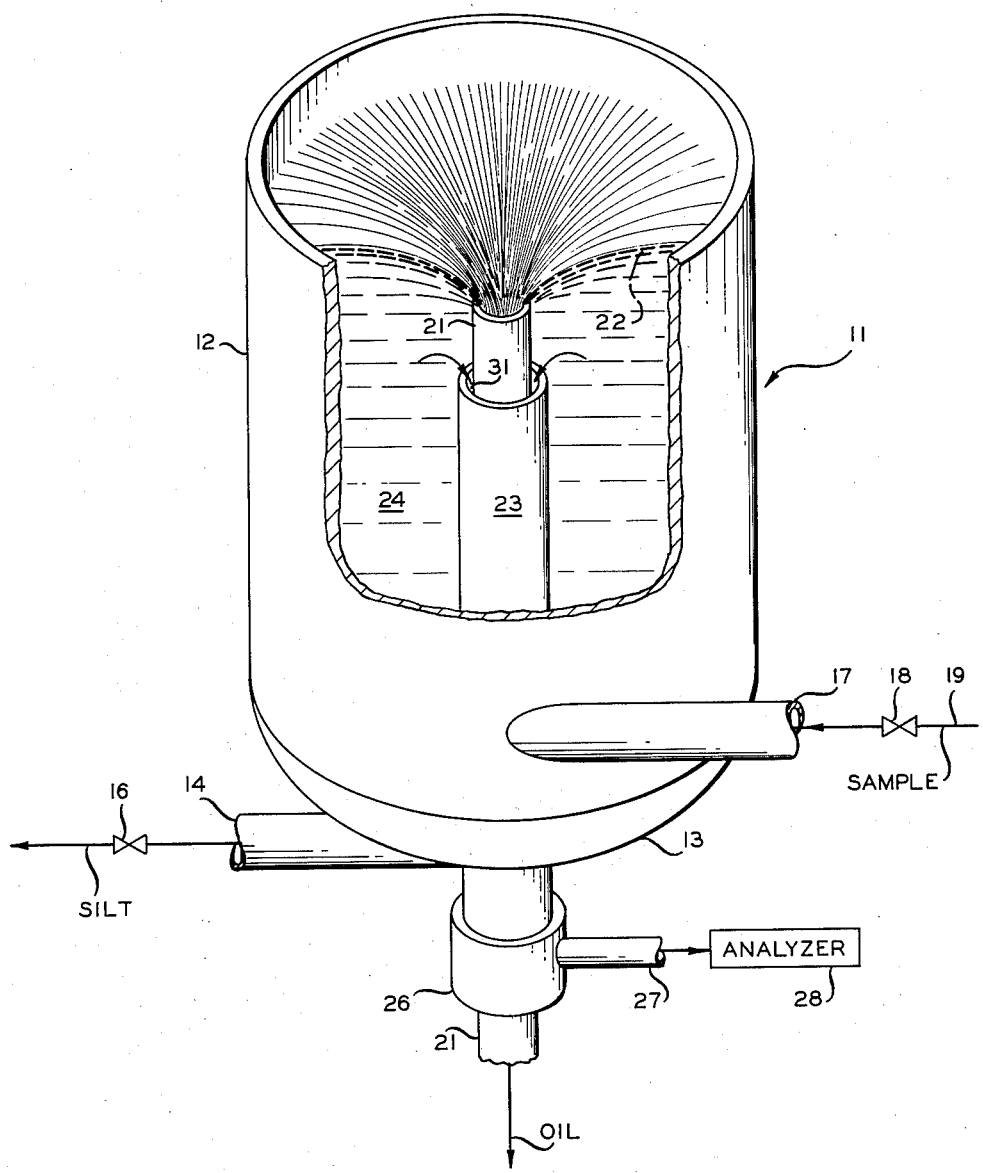
INVENTOR.
H. D. SWEENEY
BY Hudson D. Young
ATTORNEYS

United States Patent Office 3,215,272
Patented Nov. 2, 1965

3,215,272
PROCESS OF SEPARATION OF SUSPENDED FOREIGN MATERIALS FROM AN AQUEOUS MEDIUM
Harold D. Sweeney, Bartlesville, Okla., assignor to Phillips Petroleum Company, a corporation of Delaware
Filed May 16, 1961, Ser. No. 110,434
1 Claim. (Cl. 210—84)

This invention relates to a method for concurrently removing particulate solids and immiscible liquids from an aqueous medium. In another aspect, it relates to separation of an aqueous medium so that it is suitable for pH analysis from a plant stream comprising silt, hydrocarbon oil, and water. In still another aspect, it relates to preparing an aqueous process stream for turbidity analysis by first removing entrained hydrocarbon oil globules in the aqueous medium.

In the chemical process industries, cooling towers are a commonly found unit operation. It is desirable to periodically or continuously sample the cooling tower water for analysis purposes, typically the measurement of pH. An unavoidable feature of cooling water is that it is often contaminated with hydrocarbon oils from leaking conduits, and builds up silt which enters the system from the circulating and feed water, and from the atmosphere. Thus, sample streams of oil and silt-laden cooling tower water present a fluid simply not in a condition suited for many physical or chemical analyses.

A similar problem is confronted in petroleum operations involving the presence of hydrocarbon oil globules in a sample stream being passed to a turbidity analyzer, or electrophotometer. For example, this condition arises in the pretreatment of a hydrocarbon distillate stream with a dilute caustic stream in order to remove therefrom $H_2S$ and light mercaptans, before further utilization of the distillate stream.

The hydrocarbon distillate is mixed with aqueous caustic to form a true emulsion in which some of the sulfur compounds tie up with the sodium ions. The emulsion then passes to a settler or an emulsion breaker, wherein distillate and aqueous caustic phases reform. Usually, this emulsion break is less than complete. Consequently, a periodic measurement of the degree of break is desirable as a process control variable. The separated caustic phase, now usually characterized as a "white-water" caustic, is passed, in part, to turbidity analyzer to measure the success of the emulsion break. Invariably, oil globules, and the like, are entrained in this sample stream, the presence of which interferes with the efficient operation of the analyzer. Manifestly, a device that will easily remove such extraneous components from the sample stream before its entry to the photometer tube would be most useful.

In accordance with the present invention, I have discovered that particulate solids and/or immiscible liquids can be advantageously separated from an aqueous medium by the use of my novel separator apparatus, which is characterized by a small volume to decrease sample lag time, and lacks any obstructions within the separator which will cause turbulence, and thus interfere with clean separation of the aqueous medium from the other components of the mixture.

A relatively small volume of the process stream is directed first to the separator and then to the analysis instrument. As to the operation of the separator itself, a fluid mixture, typically a hydrocarbon oil-aqueous-silt, is introduced tangentially to the inside surface of a usually circular casing to cause the heavier solids to stay at the outside of the described chamber, and settle into the bottom portion thereof, from which they can be removed, as required. The dispersed lighter oil phase will rise to the top portion of the chamber, while the aqueous medium settles to the bottom portion, forming two distinct layers. The oil will be collected from the vortex which forms at the center of the chamber, via a centrally disposed outlet weir. The aqueous medium is withdrawn through a second weir disposed with its open end intermediate the level of the first outlet weir and the level of entry of the mixture. The medium then passes directly to the analysis instrument.

In a preferred embodiment, the two weir pipes are concentrically disposed, so that the separated aqueous medium drains through the annulus formed between them, while the oil continues to be withdrawn from the center pipe.

Accordingly, it is an object to prepare an aqueous process stream for a turbidity analysis by first removing globules of an immiscible liquid entrained in the aqueous medium.

Referring now to the drawing in detail, there is shown the separator of this invention, generally designated 11, employed in a sample stream analysis system. Separator 11 comprises a casing 12, closed at the lower end thereof by a member 13, which member is most conveniently hemispherically-shaped. This facilitates the withdrawal, as required, of settled particulate solids via conduit 14, having valve 16, therein, which conduit communicates with the low point of the chamber.

An inlet conduit 17, having valve 18 therein, is secured horizontally to the middle portion of casing 12, and is in communicaton with the inner wall of said casing. Thus, a sample stream 19 from a process stream (not shown) enters separator 11 via conduit 17, being introduced tangentially to the inside surface of the casing 12.

A first weir 21 is centrally positioned within casing 12 and adapted to draw off the lighter separated liquid which forms an upper layer 22 within the casing, and conduct said liquid via conduit 21 through the bottom portion 13 to disposal. This higher weir is preferably centrally disposed to facilitate collection of the liquid droplets from the center of the vortex which the tangential entry of the sample stream creates.

A second weir 23 is also positioned within casing 12 below weir 21 with a difference in height ranging between one and three inches. Lower weir 23 is provided to draw off the separated aqueous medium in layer 24 and conduct said medium through the bottom member 13, T 26, conduit 27, to an analyzer 28, such as a pH meter. pH meters are well known in the art and can be obtained commercially from several instrument manufacturers. pH meters are described, for example, in Industrial Instruments for Measurement and Control, Thomas J. Rhodes, McGraw-Hill Book Co., Inc., New York (1941), pages 542–550.

Weir 23 may be positioned almost anywhere within the casing, but it is most conveniently disposed concentrically about higher weir 21, forming an annulus 31, through which the aqueous medium is drawn to inlet conduit 27 of the analyzer. It is seen that T 26 is employed to change the direction of the one of the two liquid streams from the bottom of separator 11, that is, the annulus stream 31 now passing via conduit 27 to the analyzer.

In operation, an aqueous medium containing suspended solids and/or droplets of an immiscible liquid dispersed therein, is withdrawn from a process stream or vessel (not shown) via conduit 19. The mixture enters separator 11 via horizontal inlet conduit 17 continuously, or wherever permitted by the opening of valve 18. The mixture tangentially impinges on the inside wall of casing 12, preferably above the hemispherically-shaped closure member 13.

The particulate solids, if any are present, settle into the receptacle formed by member 13, and are withdrawn via conduit 14, as required. The lighter immiscible fluid, such as a hydrocarbon oil, rises to form top layer 22 which drains (along with some of the aqueous material) through weir 21, while the lower aqueous layer which forms, drains through weir 23, or via the annulus 31, that is formed with weir 21 if they are concentrically disposed. The separated aqueous sample flows via outlet conduits 27 to the analyzer 28, and is exhausted therefrom to waste, or to be returned to the process stream (both not shown).

There is no critical range of flow rates for the introduced mixture with the novel apparatus of this invention as it will operate over a wide range of flow rates. However, a minimum rate of flow is necessary which is sufficient to throw out the particulate solids, and also to effect the creation of a vortex about the higher weir for efficient removal of the lighter, immiscible phase.

Although the separator of this invention is described primarily as related to purifying an aqueous medium prior to its being passed to a pH meter, this invention is not limited to this illustrative application. It can be employed in any situation where it is necessary to remove particulate solids and/or immiscible liquids from a fluid medium, before that medium can be further processed or analyzed.

Various modifications and alterations of this invention will become apparent to those skilled in the art without departing from the scope and spirit of this invention and it should be understood that the latter is not necessarily limited to the aforementioned discussion.

I claim:

The method of separating a mixture of first and second immiscible liquids of different densities having solids suspended therein so as to obtain a stream of the liquid of higher density for purposes of analysis, which method comprises the steps of introducing said mixture tangentially and in a generally horizontal direction into a vertically extending cylindrical separation zone at a first location intermediate the top and bottom of said separation zone, said separation zone having axially extending first and second discharge means adjacent the axis of said separation zone for withdrawing liquids from said separation zone, the interior of said separation zone being unobstructed except for said first and second discharge means; centrifugally and gravitationally separating said first and second liquids from each other and from said solids in said separation zone; withdrawing said solids from the bottom of said separation zone; withdrawing said liquid of lower density from an upper region of said separation zone through said first discharge means; withdrawing said liquid of higher density from an intermediate region of said separation zone through said second discharge means, said intermediate region being below said upper region and above said first location; and passing said withdrawn liquid of higher density to an analysis zone which is independent of said separation zone.

References Cited by the Examiner

UNITED STATES PATENTS

| | | | |
|---|---|---|---|
| 2,193,261 | 3/40 | Thomson | 210—84 X |
| 2,565,343 | 8/51 | Benham | 210—304 X |
| 2,752,307 | 6/56 | Baran et al. | 210—96 X |
| 2,967,618 | 1/61 | Vane | 209—211 |
| 3,044,236 | 7/62 | Bearden et al. | 55—270 X |

REUBEN FRIEDMAN, *Primary Examiner.*

HERBERT L. MARTIN, *Examiner.*